US009231906B2

(12) United States Patent
Chu et al.

(10) Patent No.: US 9,231,906 B2
(45) Date of Patent: Jan. 5, 2016

(54) METHOD OF ASSIGNING IDENTIFICATION CODES TO DEVICES IN A NETWORK

(75) Inventors: Man Yin Arthur Newton Chu, Hong Kong (CN); Kai Chi Chan, Hong Kong (CN)

(73) Assignee: DEFOND COMPONENTS LIMITED, Chai Wan, Hong Kong (CN)

( * ) Notice: Subject to any disclaimer, the term of this patent is extended or adjusted under 35 U.S.C. 154(b) by 1116 days.

(21) Appl. No.: 13/268,126

(22) Filed: Oct. 7, 2011

(65) Prior Publication Data
US 2013/0089157 A1 Apr. 11, 2013

(51) Int. Cl.
G06F 3/00 (2006.01)
G06F 13/00 (2006.01)
H04L 29/12 (2006.01)
G06F 12/06 (2006.01)

(52) U.S. Cl.
CPC ........ *H04L 61/2038* (2013.01); *G06F 12/0676* (2013.01)

(58) Field of Classification Search
CPC .................................. G06F 13/00; G06F 9/00
USPC ............................................................ 710/9
See application file for complete search history.

(56) References Cited

U.S. PATENT DOCUMENTS

| 4,695,839 | A | * | 9/1987 | Barbu et al. ................... 340/3.21 |
| 5,715,475 | A | * | 2/1998 | Munson et al. ................. 710/10 |
| 6,397,280 | B1 | * | 5/2002 | Nitschke et al. ............... 710/110 |
| 2006/0282549 | A1 | | 12/2006 | Vinnemann |
| 2007/0204082 | A1 | | 8/2007 | Shimizu |
| 2010/0121537 | A1 | | 5/2010 | Tanaka |
| 2012/0221755 | A1 | * | 8/2012 | Schultz .......................... 710/110 |
| 2012/0293680 | A1 | * | 11/2012 | Guan ............................ 348/222.1 |

OTHER PUBLICATIONS

European Patent Office, International Search Report in International Patent Application No. EP 11 25 0922 (Mar. 2, 2012).

* cited by examiner

*Primary Examiner* — Titus Wong
(74) *Attorney, Agent, or Firm* — Leydig, Voit & Mayer, Ltd.

(57) ABSTRACT

A method of assigning identification codes to devices, each device including a controller, a memory, and a switch, with the devices connected in a series circuit. The method includes opening all of the switches, supplying a signal, including an identification code, to the first device of the series circuit and storing the identification code in the memory of the first device, closing the switch of the first device to connect to the next device in the series circuit, sending an acknowledgement to the series circuit, and repeating the process for each of the devices, successively, for each of the devices in the series circuit, and assigning a different identification code to each of the devices.

14 Claims, 5 Drawing Sheets

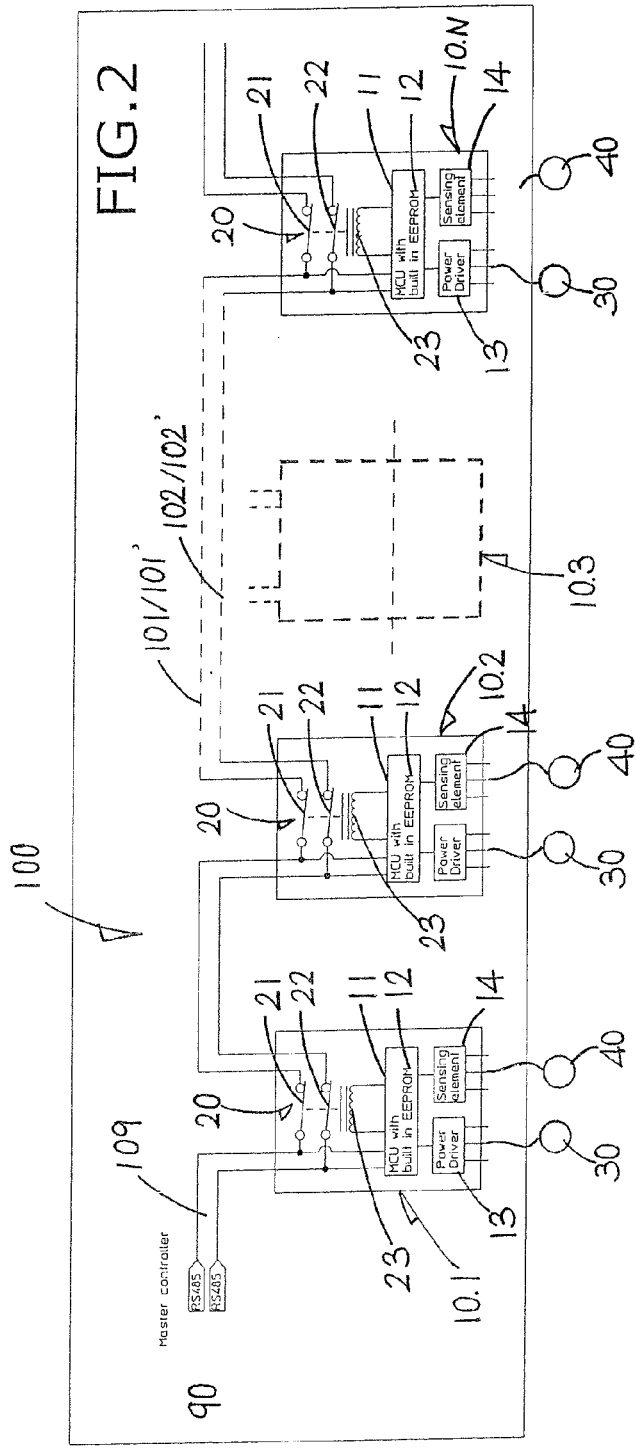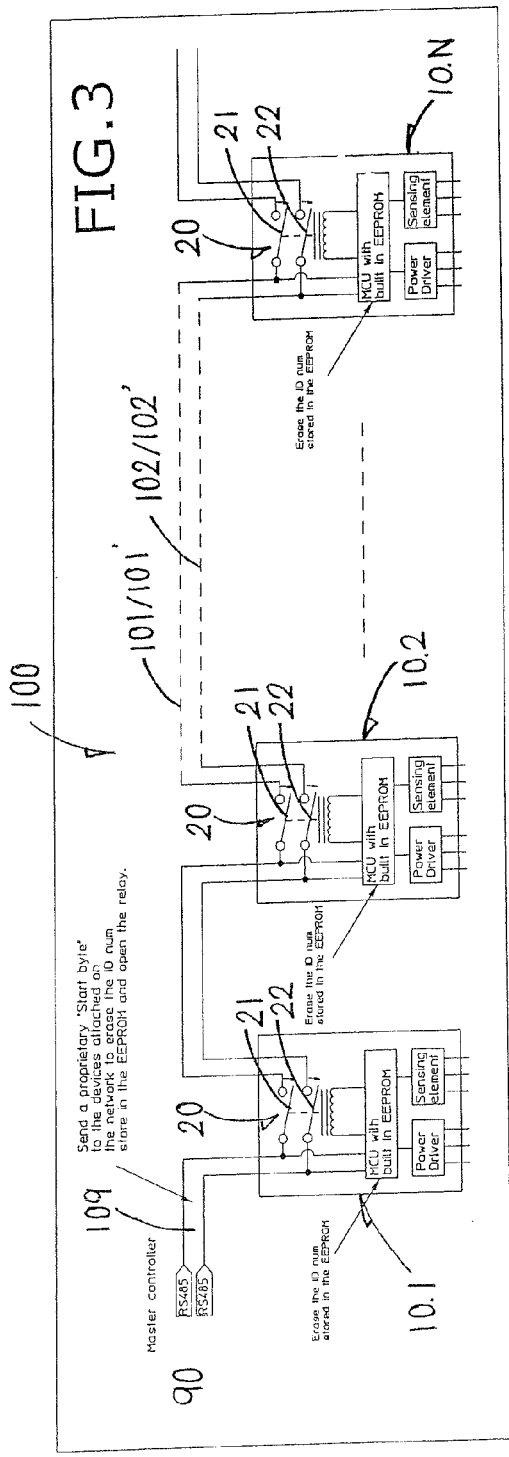

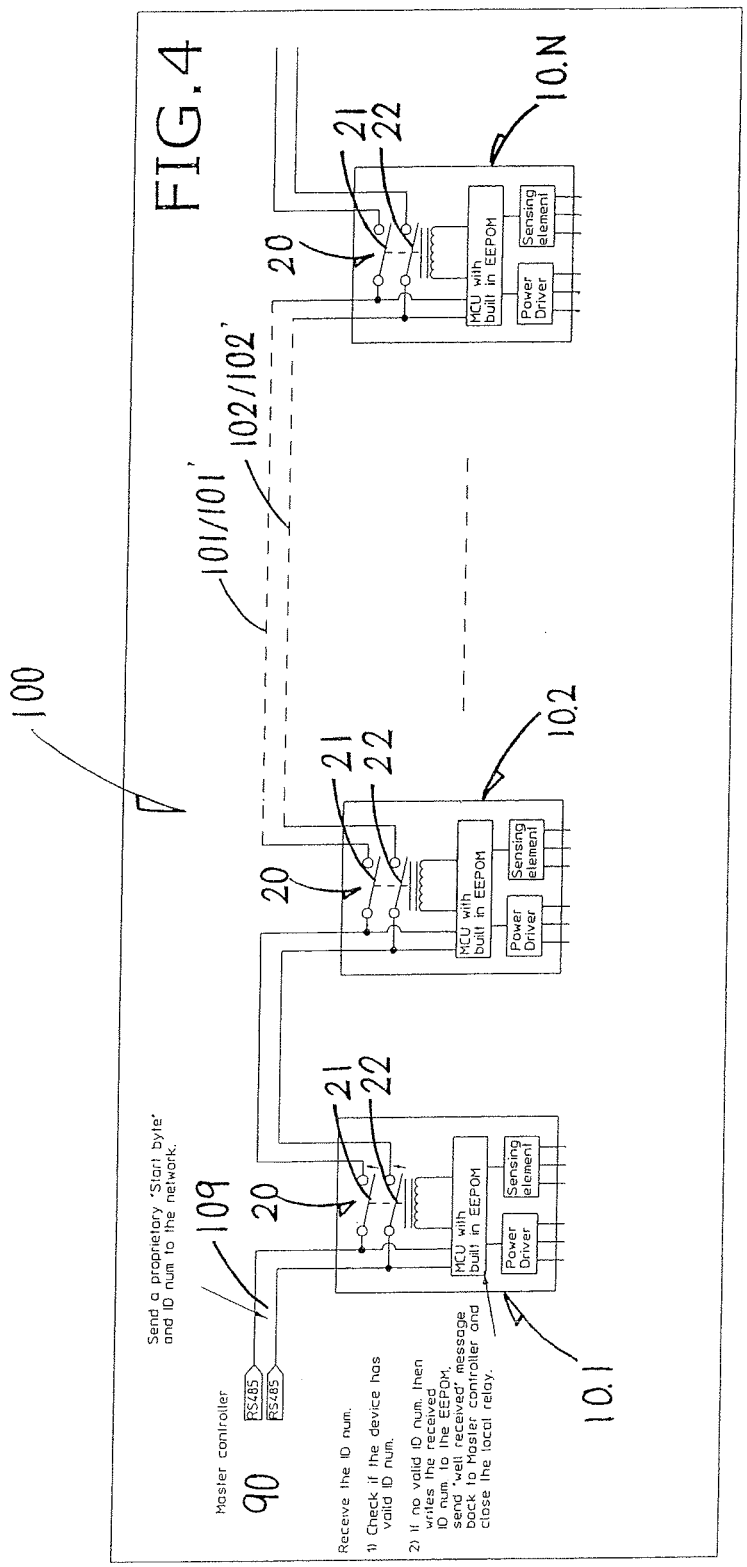

METHOD OF ASSIGNING IDENTIFICATION CODES TO DEVICES IN A NETWORK

The present invention relates to a method of assigning identification codes to a plurality of devices connected in a network.

BACKGROUND OF THE INVENTION

DMX512 (i.e. Digital Multiplex with 512 pieces of information) is a standard protocol for digital communication networks. It is being widely used in certain industries and in particular the stage lighting industry. RDM (i.e. Remote Device Management) is a protocol enhancement to DMX512 that allows bi-directional communication between each individual device and the master controller. It allows every individual device to report the current status back to the master controller. e.g. temperature and power consumption, etc.

The network construction of DMX512 is based on EIA-485, a standard defining the electrical characteristics of drivers and receivers for use in balanced digital multipoint systems. It supports bi-directional digital communication. Every device linked in the system has a unique identification address or ID code for sending and receiving commands and data between the individual device and the master controller. During installation, it is necessary to assign a unique ID code to each individual device linked in the system either by setting certain DIP switches or programming it onto EEPROM. This makes installation tedious and time consuming.

The invention seeks to mitigate or at least alleviate such a problem by providing a new or otherwise improved method of assigning identification codes to a plurality of devices connected in a network.

SUMMARY OF THE INVENTION

According to a first aspect of the invention, there is provided a method of assigning identification codes to a plurality of devices connected in a network, each device including a controller, a memory and a switch, the method comprising the following steps:
(a) connecting the devices with their switches in a series circuit from a first device to a second device and so on, and with their controllers connected to an adjacent node of the series circuit at a position upstream of the corresponding switches, the series circuit having a head end including said node of the first device;
(b) ensuring that all the switches are in an open position;
(c) providing a signal, including an identification code, to the series circuit at its head end;
(d) the controller of the first device receiving and then storing the identification code in the corresponding memory, whereby the first device is assigned with the identification code;
(e) the controller of the first device then closing the corresponding switch to extend the series circuit to the next device;
(f) the controller of the first device sending an acknowledgement to the series circuit after storing the identification code in the memory in step (d); and
(g) repeating steps (c) to (f) for each of the remaining devices successively from the second device for assigning a different identification code to each of the remaining devices successively from the second device.

Preferably, step (b) comprises opening all the switches.

Preferably, the switches are normally-closed, and step (b) comprises providing a command to the series circuit at its head end and in response the controllers of all the devices opening the corresponding switches.

More preferably, step (b) includes the controllers of all the devices clearing the corresponding memories before opening the corresponding switches.

It is preferred that step (d) includes the controller of the first device storing the identification code in the memory only when the memory does not hold an identification code.

It is preferred that step (d) includes the controller of the first device checking whether or not the corresponding memory holds an identification code, and then storing the identification code in the memory only when the memory does not hold an identification code.

It is further preferred that step (d) includes the controller of the first device withholding from storing the identification code in the memory when the memory already holds an identification code.

Preferably, step (c) is carried out only when an acknowledgement of step (f) is received in the series circuit.

More preferably, step (c) is carried out only when an acknowledgement of step (f) is received in the series circuit within a time-out period, and the method will terminate when the time-out period expires in the absence of said acknowledgement.

It is preferred that step (g) involves each of the devices connected to the series circuit by the switches that are closed, including the first device.

In a preferred embodiment, the method includes connecting a master controller at the head end of the series circuit for carrying out step (c).

In a specific arrangement, each of the devices has a pair of said switches operating in tandem, which are connected in step (a) to respective said series circuits running in parallel.

It is preferred that each switch is provided by a solenoid relay.

Preferably, step (g) includes progressively changing the identification code from one device to the next device.

It is preferred that each controller is provided by an MCU.

It is preferred that each memory is provided by an EEPROM.

BRIEF DESCRIPTION OF DRAWINGS

The invention will now be more particularly described, by way of example only, with reference to the accompanying drawings, in which:

FIG. 2 is a functional block diagram of a network of devices on which the method of FIGS. 1A and 1B is to operate;

FIG. 3 is a functional block diagram as that of FIG. 2, showing the initial condition of the devices at start of the method;

FIG. 4 is a functional block diagram subsequent to that of FIG. 3, showing a change in the condition of the first device after having been assigned an identification code.

DETAILED DESCRIPTION OF PREFERRED EMBODIMENT

Figure 1A:
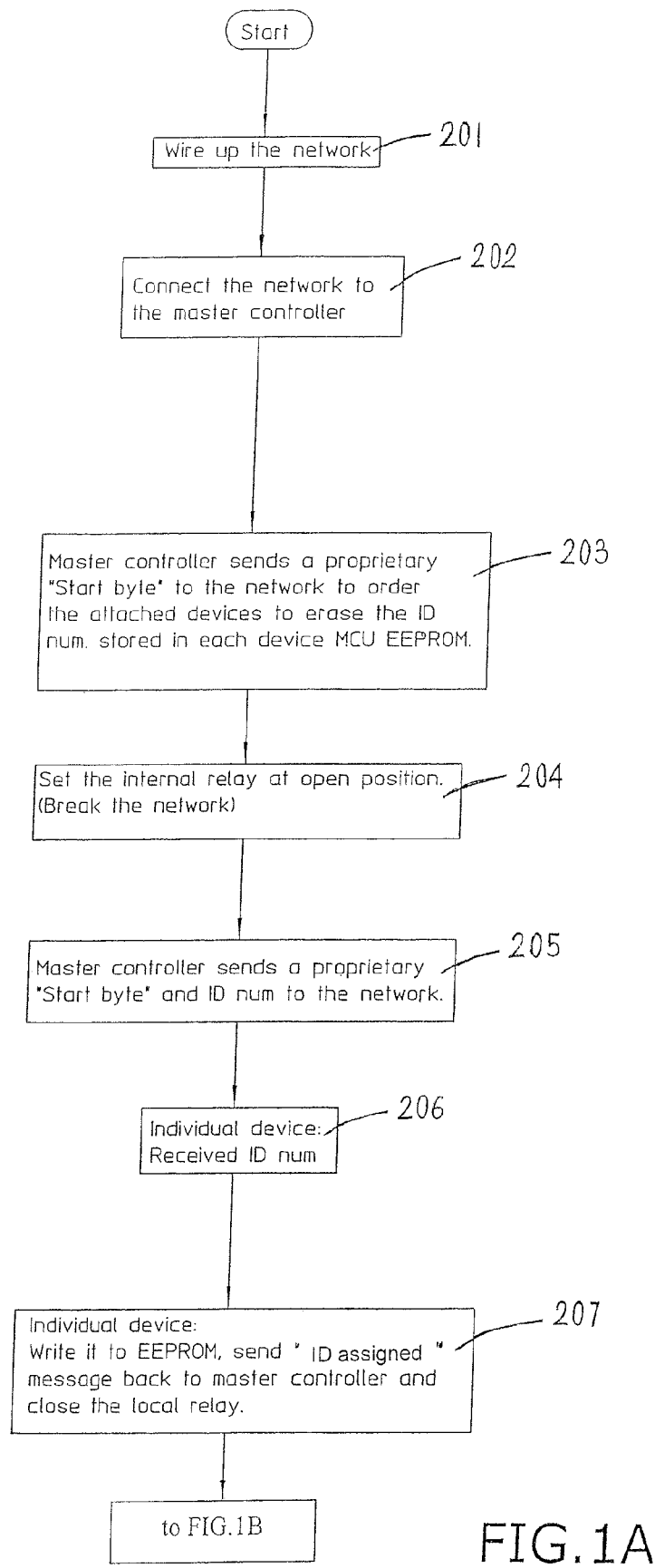
FIGS. 1A and 1B combined is an operation flow chart that illustrates the operation of an embodiment of a method of assigning identification codes to a plurality of devices connected in a network in accordance with the invention.

Referring to FIGS. 1A and 1B and 2 to 5 of the drawings, there are illustrated a method of assigning identification or ID codes to a plurality of devices 10 connected in a network 100 embodying the invention, and the network 100 of devices 10 is also shown. For simplicity, only the first device 10.1, the second device 10.2, the third device 10.3 (in dotted outline only) and the nth device 10.N in the network 100 are depicted, including a master controller 90 connected to the network 100 at a head end 109 thereof. The method is hereinafter referred to the auto-addressing method.

In this particular embodiment, the network 100 implements an intelligent lighting control system for use in a commercial or residential building, in which the devices 10 are installed at various floors and/or locations of the building, each being connected with and for controlling the operation of an electrical light unit 30 provided by one or more incandescent bulbs, florescent tubes or LED lamps for illumination. The master controller 90 may be provided by a computer or server located in the management office and installed with appropriate software to perform central controls.

Each device 10 incorporates a number of components, namely an MCU controller 11 with a built-in EEPROM (Electrically-Erasable Programmable Read-Only Memory) 12, a power driver 13, a sensing element 14 and a solenoid relay 20.

The MCU controller 11 may be implemented by alternative options such as a microprocessor control unit, microcontroller unit, microcontrol unit or micro computer unit, to which the other device components are connected for control thereby. It is programmed to perform different various functions and controls including various steps of the auto-addressing method. The EEPROM 12 is an internal erasable memory for storing an ID code or address by reference to which the devices 10 and hence associated light units 30 may be identified and accessed.

The power driver 13 drives an associated light unit 30 connected thereto, and may include a voltage regulator for regulating/converting the mains power to drive the light unit 30.

The sensing element 14 provides a port for connecting an external sensor 40 to sense a certain parameter relevant to the operation of the light unit 30. The sensor 40 may be, for example, a temperature probe for sensing the operating temperature of the light unit 30, or a current coil for sensing the load current of the light unit 30. Such temperature or current indicates the operating condition or status of the light unit 30 and is being monitored by the MCU 11. In response to an abnormal or faulty condition, such as overheating or overcurrent, the MCU controller 11 will disable the power driver 13 to cut off the light unit 30 and/or feedback an alert signal to inform the master controller 90 accordingly.

The solenoid relay 20 is a normally-closed double-pole solenoid relay incorporating a pair of first and second switches 21 and 22 and a solenoid coil 23 for simultaneously operating, i.e. opening and closing, the switches 21 and 22 in tandem. The solenoid coil 23 is connected to the MCU controller 11 for control thereby.

The DMX512 protocol is employed for two-way communication between the master controller 90 and the MCU controllers of the various devices 10 at different remote locations. By nature of the DMX512 protocol, up to 512 light units 30 may be controlled by the master controller 90 via the corresponding devices 10 (i.e. 10.1 to 10.512), with each light unit 30 being controllable to illuminate a selected one of 255 different levels of light intensity or to turn off. The light intensity of each light unit 30 is controlled by means of the associated power driver 13, which includes a logic light dimmer operable by way of Pulse Width Modulation (PWM).

At the data-link layer, a DMX512 controller (e.g. master controller 90) transmits asynchronous serial data at 250 kbaud, in a data format of one start bit, eight data bits, two stop bits and no parity. The start of a packet is signified by a break followed by a logical "mark", known as the "Mark after Break". The break, which signals the end of one packet and the start of another, causes receivers to start reception and also serves as a frame (position reference) for data bytes within the packet. Framed data bytes are known as slots. Following the break, up to 513 slots may be sent. The first slot is reserved for a "start code" that specifies the type of data in the packet. A start code of 0x00 (hexadecimal zero), often referred to as a "start byte", is the standard value used for all DMX512 compatible devices, including lighting fixtures and dimmers. All slots following the start code contain control settings for slave devices (e.g. MCU controllers 11). A slot's position within the packet determines the device (e.g. device 10) and function to be controlled, while its data value specifies the control set point.

The network 100 is a balanced digital multipoint system for long distance communication, and for this purpose and to safeguard against electrical noises, the master and MCU controllers 90 and 11 are built compliant to the RS485 standard. Extending from the master controller 90, a twisted pair of lines 101 and 102 form the backbone of the network 100, to and along which the devices 10 are connected in a linear configuration sequentially from the first device 10.1 to the second device 10.2 then to the third device 10.3 and so on.

Each device 10 is connected via its own relay 20, with the relay's first and second switches 21 and 22 connected in series with, and forming a link in, the network lines 101 and 102 respectively. Taking all the devices 10 together, their first switches 21 are connected in one series circuit 101' along the first line 101 and their second switches 21 in another series circuit 102' along the second line 102, and the two circuits 101' and 102' run in parallel.

The two lines 101 and 102 or circuits 101' and 102', and hence the network 100 in general, can be cut and later re-connected at each device location by operating the relevant relay 20.

In each of the devices 10, the MCU controller 11 is also connected to the network lines 101 and 102, at an adjacent node of the series circuits and at a position upstream of the associated relay switches 21 and 22. This arrangement permits communication by the MCU controller 11 with an upstream device (and in particular the master controller 90) even if the switches 21 and 22 are open and disconnect the downstream devices.

The head end 109 of the network 100 and hence the series circuits 101' and 102' includes the said node associated with the first device 10.1, at which the first device's MCU controller 11 and switches 21 and 22 are connected directly to the master controller 90. Thus the first device 10.1 is always connected to the master controller 90.

The operation of the auto-addressing method on the network 100 is now described. The network 100 is first wired up (box 201 of FIG. 1A) and connected to the master controller 90 (box 202). The switches 21 and 22 of all the devices 10 should initially be closed such that both series circuit 101' and 102' are uninterrupted. This is the default condition given that the relays 20 are normally-closed in this embodiment, or measures can be taken to achieve this condition e.g. through manual manipulation.

By being connected to the head end 109 of the series circuits 101' and 102', all commands and signals from the master controller 90 for the network 100 are always issued or provided at the head end 109.

Initially, the master controller 90 sends a proprietary "start byte" command to the network 100 to order all the devices 10 to clear their memories and in particular to erase their ID codes stored in their EEPROMs 12 (box 203). This step is necessary only in the case of re-installation of the network 100, when the devices 10 have been assigned with certain ID codes which are no longer valid and should be updated.

To prepare for assignment of ID codes to the devices 10 individually, the network 100 should be broken at every device location. This is done by the master controller 90 issuing a proprietary command to instruct all the devices 10 to open their relays 20, i.e. the relay switches 21 and (box 204), and to remain at the all open position. Although this command will break the network linkage, the connection between the master controller 90 and the first device 10.1 will stay, as this is a direct or permanent connection meant to be unbreakable.

The master controller 90 then sends a proprietary "start byte" command and a unique ID code to the network 100 (box 205). The first device 10.1 receives the ID code (box 206) as it is the only connected device. The first device 10.1 then writes the ID code onto its EEPROM 12, sends back an "ID assigned" message to the master controller 90 after the ID code has been stored, and finally closes its relay 20 to re-establish the linkage or connection to the second device 10.2 (box 207), i.e. extending the series circuits 101'/102'. The first device 10.1 has now been assigned with an ID code.

Figure 1B:
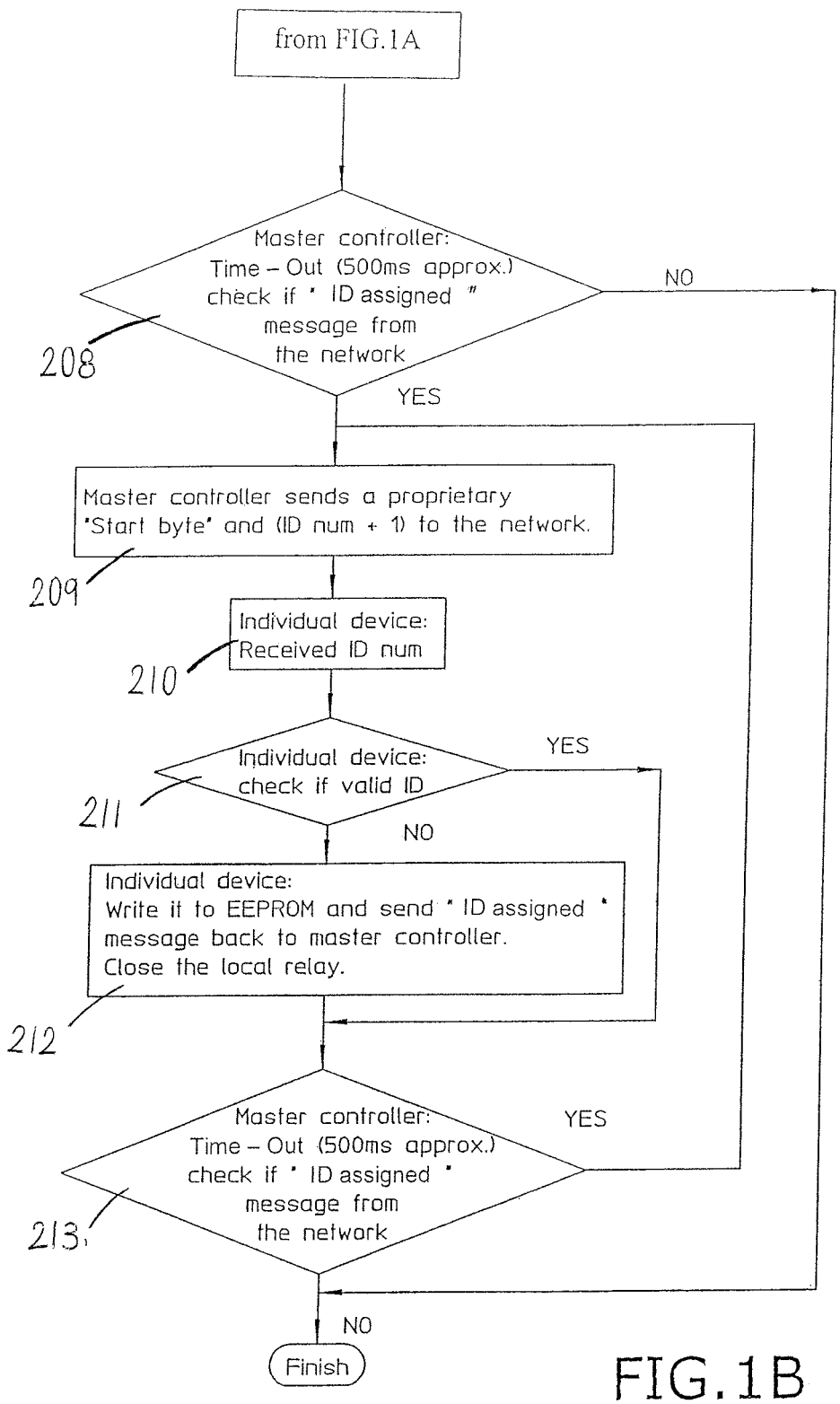
Figure 5:
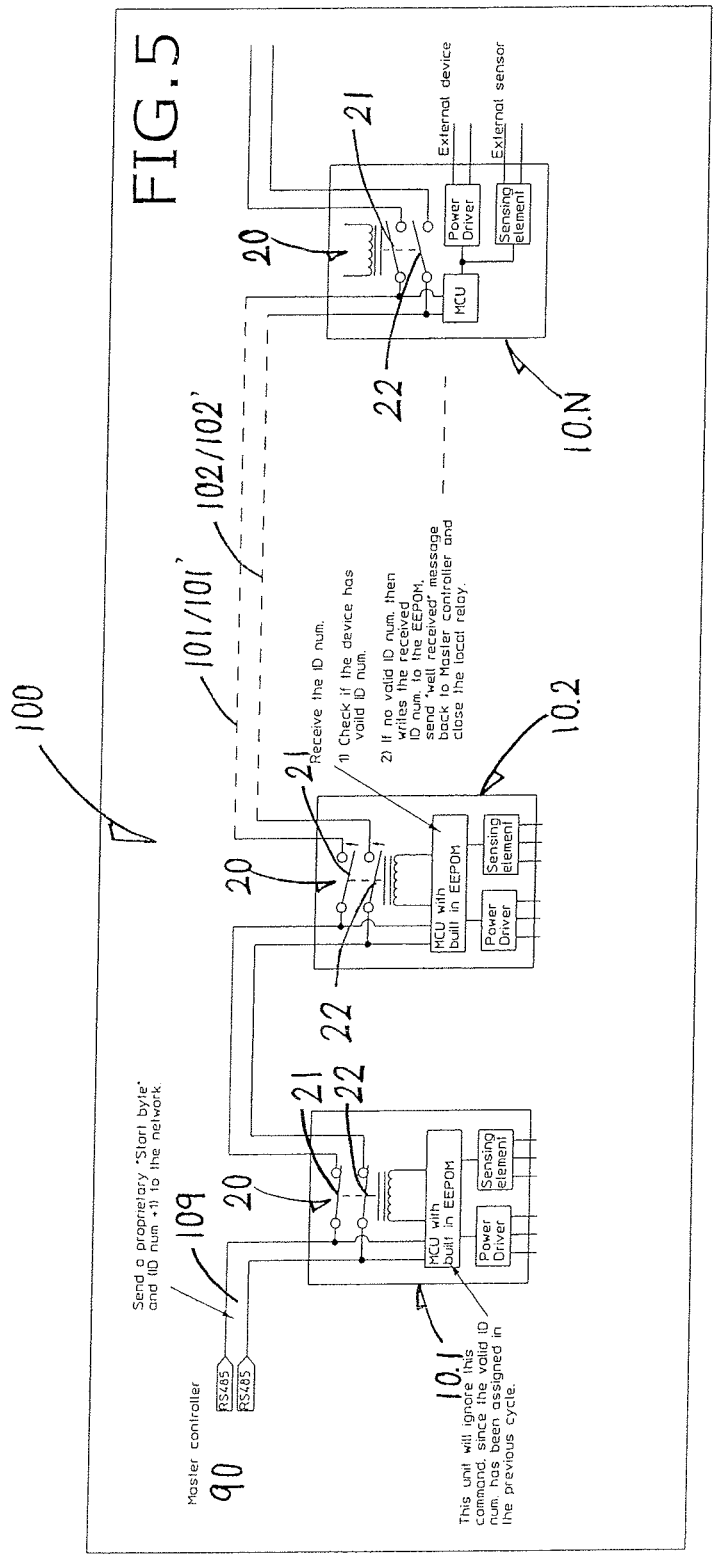
FIG. 5 is a functional block diagram subsequent to that of FIG. 4, showing a change in the condition of the second device after having been assigned an identification code, and so forth.

The master controller 90 checks whether an "ID assigned" message is received in the network 100 (from any connected devices 10 and this time only the first device 10.1) within a time-out period of 500 ms (box 208 of FIG. 1B). In the affirmative, the master controller 90 will send another proprietary "start byte" command with a new or the next ID code, i.e. the last ID code plus 1, to the network (box 209). The master controller 90 will only do so when an "ID assigned" message is received within the time-out period.

All the connected devices, i.e. only the first and second devices 10.1 and 10.2 at this time, receive the new ID code (box 210). Each of them then checks whether itself has already been assigned with a valid ID code in the EEPROM 12 (box 211). In the affirmative, the first device 10.1 will not store the new ID code just received, or any of more new ID codes to come, i.e. skipping the next step (box 212).

In the absence of a valid ID code, the second device 10.2 proceeds with actions of the next step, i.e. then writing the received ID code onto its EEPROM 12, sending back an "ID assigned" message to the master controller 90 after the ID code has been stored, and finally closing its relay 20 to re-connect, or extend the series circuits 101'/102' to, the next i.e. third device 10.3 (box 212). The second device 10.2 has now been assigned with its own unique ID code.

The master controller 90 checks whether an "ID assigned" message is received from the network (from any connected devices 10 and this time specifically the second device 10.2) within a time-out period of 500 ms (box 213). In the affirmative, the master controller 90 will send another proprietary "start byte" command with the next ID code, i.e. the last ID code plus 1, to the network (box 209).

All the devices now connected, i.e. the first to third devices 10.1 to 10.3, receive the next ID code (box 210). Each of them then checks whether itself has already been assigned with a valid ID code in the EEPROM 12 (box 211). As the first and second devices 10.1 and 10.2 already have their own ID codes, they will not accept any further ID codes, i.e. with-holding from storing of any new ID code in their memories when the latter already holds an ID code.

Amongst all the devices having received a valid ID code, being the only one in need of the same, the third device 10.3 proceeds with storing up the received ID code, acknowledging with an "ID assigned" message and then re-establishing the connection to the next i.e. fourth device (box 212). The third device 10.3 acquires a unique ID code in the same manner as the second device 10.2 did as described above.

The master controller 90 repeated the ID code allocation procedures in cycles for the second and third devices 10.2 and 10.3 and will repeat the same in cycles for the fourth device and then each of the remaining devices in the system successively one by one until all the devices have been assigned with a different ID code.

Each cycle of the procedures involves each or all of the devices 10 connected to the series circuits 101' and 102' by the relay switches 21 and 22 that are closed, including the first device 10.1 that is permanently connected. Only the last connected device 10 will respond positively to an ID code provided by the master controller 90, i.e. storing the ID code, because its EEPROM 12 is empty.

During the process, the master controller 90 progressively changes the ID codes from one device to the next device, thereby preventing duplication of the ID codes to ensure a unique address for each device 10.

After the last device has acknowledged the allocation, the master controller 90 will send yet another proprietary "start byte" command with the next ID code (box 209). However, as all the devices have acquired an ID code, none of them will respond with an "ID assigned" message. In the absence of this message, the master controller 90 will terminate the auto-addressing process when the time-out period expires (box 213).

The method according to the invention allows the system to assign a unique ID code or address to every device linked onto the network 100 automatically, according to the order in which the devices 10 are connected to the network 100. It saves the need of physical manipulation at each device location. Moreover, the method can simply be repeated after re-installation of the network 100, e.g. with certain devices 10 removed or added. The order in which the devices 10 are arranged initially, or after alternation, is irrelevant to the carrying out of the method. The identification code or address assigned to each of the devices 10 is guaranteed to be unique, and there is no need to keep record of the same.

It is noted that the subject invention is not restricted to the DMX512 protocol and is applicable to any other network protocols. In a different embodiment, as EEPROM is not the only way to store the ID code, any other all other suitable non-volatile memory devices may be used e.g. flash memory.

The invention has been given by way of example only, and various other modifications of and/or alterations to the described embodiment may be made by persons skilled in the art without departing from the scope of the invention as specified in the appended claims.

The invention claimed is:

1. A method of assigning identification codes to a plurality of devices connected in a network, each device including a controller, a memory, and a switch, the method comprising:
   (a) connecting the devices in a series circuit, adjacent pairs of the devices being connected at respective nodes of the series circuit, each controller being connected to an adjacent node of the series circuit at a position upstream of the switch of the respective controller, the series circuit having a head end including the node connected to a first device of the series circuit;
   (b) opening all of the switches of all of the devices and ensuring that all of the switches of all of the devices connected in the series circuit are in an open state by clearing all of the memories of all of the devices before opening all of the switches of all of the devices;
(c) providing a signal, including an identification code, to the series circuit at the head end;
(d) supplying the signal to the controller of the first device and storing the identification code in the memory of the first device, whereby the first device is assigned the identification code;
(e) closing the switch of the first device to connect to the next device in the series circuit;
(f) sending an acknowledgement to the series circuit after storing the identification code in the memory of the first device; and
(g) repeating (c) to (f) for each of the devices successively following the first device, for each of the devices in the series circuit, and assigning a different identification code to each of the devices in the series circuit; successively following the first device.

2. The method as claimed in claim 1, wherein all of the switches of all of the devices are normally closed, and (b) comprises providing a command to the series circuit at the head end and, in response, opening all of the switches of all of the devices.

3. The method as claimed in claim 1, including carrying out (c) for the next device in the series circuit only when the acknowledgement of (f) is received in the series circuit.

4. The method as claimed in claim 3, including carrying out (c) for the next device in the series circuit only when the acknowledgement of (f) is received in the series circuit within a time-out period, and terminating the method when the time-out period expires without the acknowledgement.

5. The method as claimed in claim 1, including, in (g), operating each of the devices connected to the series circuit by the switches of the devices that are closed, including the first device.

6. The method as claimed in claim 1, including connecting a master controller at the head end of the series circuit for carrying out (c).

7. The method as claimed in claim 1, wherein each of the devices has a pair of the switches, with each pair of switches operating in tandem, including, in (a), connecting a first switch of each pair of switches in a first series circuit and connecting a second switch of each pair of switches in a second circuit, the first and second series circuits running in parallel.

8. The method as claimed in claim 1, wherein each switch is a solenoid relay.

9. The method as claimed in claim 1, wherein (g) includes progressively changing the identification code from one device in the series circuit to a successive device in the series circuit.

10. The method as claimed in claim 1, wherein each controller is an MCU.

11. The method as claimed in claim 1, wherein each memory is an EEPROM.

12. A method of assigning identification codes to a plurality of devices connected in a network, each device including a controller, a memory, and a switch, the method comprising:
(a) connecting the devices in a series circuit, adjacent pairs of the devices being connected at respective nodes of the series circuit, each controller being connected to an adjacent node of the series circuit at a position upstream of the switch of the respective controller, the series circuit having a head end including the node connected to a first device of the series circuit;
(b) opening all of the switches of all of the devices and ensuring that all of the switches of all of the devices connected in the series circuit are in an open state;
(c) providing a signal, including an identification code, to the series circuit at the head end;
(d) supplying the signal to the controller of the first device and storing the identification code in the memory of the first device only when the memory of the first device does not hold an identification code, whereby the first device is assigned the identification code;
(e) closing the switch of the first device to connect to the next device in the series circuit;
(f) sending an acknowledgement to the series circuit after storing the identification code in the memory of the first device; and
(g) repeating (c) to (f) for each of the devices successively following the first device, for each of the devices in the series circuit, and assigning a different identification code to each of the devices in the series circuit successively following the first device.

13. The method as claimed in claim 12, wherein (d) includes withholding from storing the identification code in the memory of the first device when the memory of the first device already holds an identification code.

14. A method of assigning identification codes to a plurality of devices connected in a network, each device including a controller, a memory, and a switch, the method comprising:
(a) connecting the devices in a series circuit, adjacent pairs of the devices being connected at respective nodes of the series circuit, each controller being connected to an adjacent node of the series circuit at a position upstream of the switch of the respective controller, the series circuit having a head end including the node connected to a first device of the series circuit;
(b) opening all of the switches of all of the devices and ensuring that all of the switches of all of the devices connected in the series circuit are in an open state;
(c) providing a signal, including an identification code, to the series circuit at the head end;
(d) supplying the signal to the controller of the first device, checking whether the memory of the first device holds an identification code, and storing the identification code in the memory of the first device only when the memory of the first device does not hold the identification code, whereby the first device is assigned the identification code;
(e) closing the switch of the first device to connect to the next device in the series circuit;
(f) sending an acknowledgement to the series circuit after storing the identification code in the memory of the first device in (d); and
(g) repeating (c) to (f) for each of the devices successively following the first device, for each of the devices in the series circuit, and assigning a different identification code to each of the devices in the series circuit successively following the first device.

* * * * *